United States Patent [19]
Mercat et al.

[11] Patent Number: 5,865,560
[45] Date of Patent: Feb. 2, 1999

[54] LOCKPIN ADAPTED TO BE USED ON A CYCLE

[75] Inventors: Jean-Pierre Mercat, Chaneins; Bruno Pilon, Chaveyrat, both of France

[73] Assignee: Mavic S.A., Saint Trivier Sur Moignans, France

[21] Appl. No.: 875,901

[22] PCT Filed: Dec. 5, 1996

[86] PCT No.: PCT/FR96/01941

§ 371 Date: Aug. 7, 1997

§ 102(e) Date: Aug. 7, 1997

[87] PCT Pub. No.: WO97/21586

PCT Pub. Date: Jun. 19, 1997

[30] Foreign Application Priority Data

Dec. 8, 1995 [FR] France ................................. 95 15020

[51] Int. Cl.⁶ ...................................................... F16B 2/18
[52] U.S. Cl. ................ 403/322.4; 403/321; 403/DIG. 4; 403/DIG. 8; 301/124.2
[58] Field of Search ..................................... 403/373, 374, 403/323, 322, 321, 324, DIG. 4, DIG. 8, 325, 322.1, 322.4, 374.5; 301/111, 110.5, 124.2; 70/233, 225

[56] References Cited

U.S. PATENT DOCUMENTS

| 4,400,038 | 8/1983 | Hosokawa | 301/124.2 |
| 5,022,672 | 6/1991 | Kawai | 301/111 X |
| 5,383,716 | 1/1995 | Stewart et al. | 301/124.2 |
| 5,409,321 | 4/1995 | Chen | 403/321 |
| 5,526,661 | 6/1996 | Lin | 301/110.5 X |
| 5,556,222 | 9/1996 | Chen | 403/323 |

FOREIGN PATENT DOCUMENTS

| 1237527 | 11/1960 | France . |
| 808188 | 5/1951 | Germany . |

Primary Examiner—Harry C. Kim
Attorney, Agent, or Firm—Greenblum & Bernstein, P.L.C.

[57] ABSTRACT

A quick-locking pin including a longitudinal rod, a first tightening stop at one end of the rod and a second tightening stop at the second end of the rod. The second tightening stop includes a second tightening ring, a lever mounted and journalled at the second end of the rod beyond the second tightening ring, the lever having a tightening cam off-centered with respect to its axis of rotation. The axle of the lever is borne by a cap located at the end of the rod between two arms. A transversely movable beam located between the arms of the cap is situated between the periphery of the cam and the external surface of the second tightening ring.

20 Claims, 4 Drawing Sheets

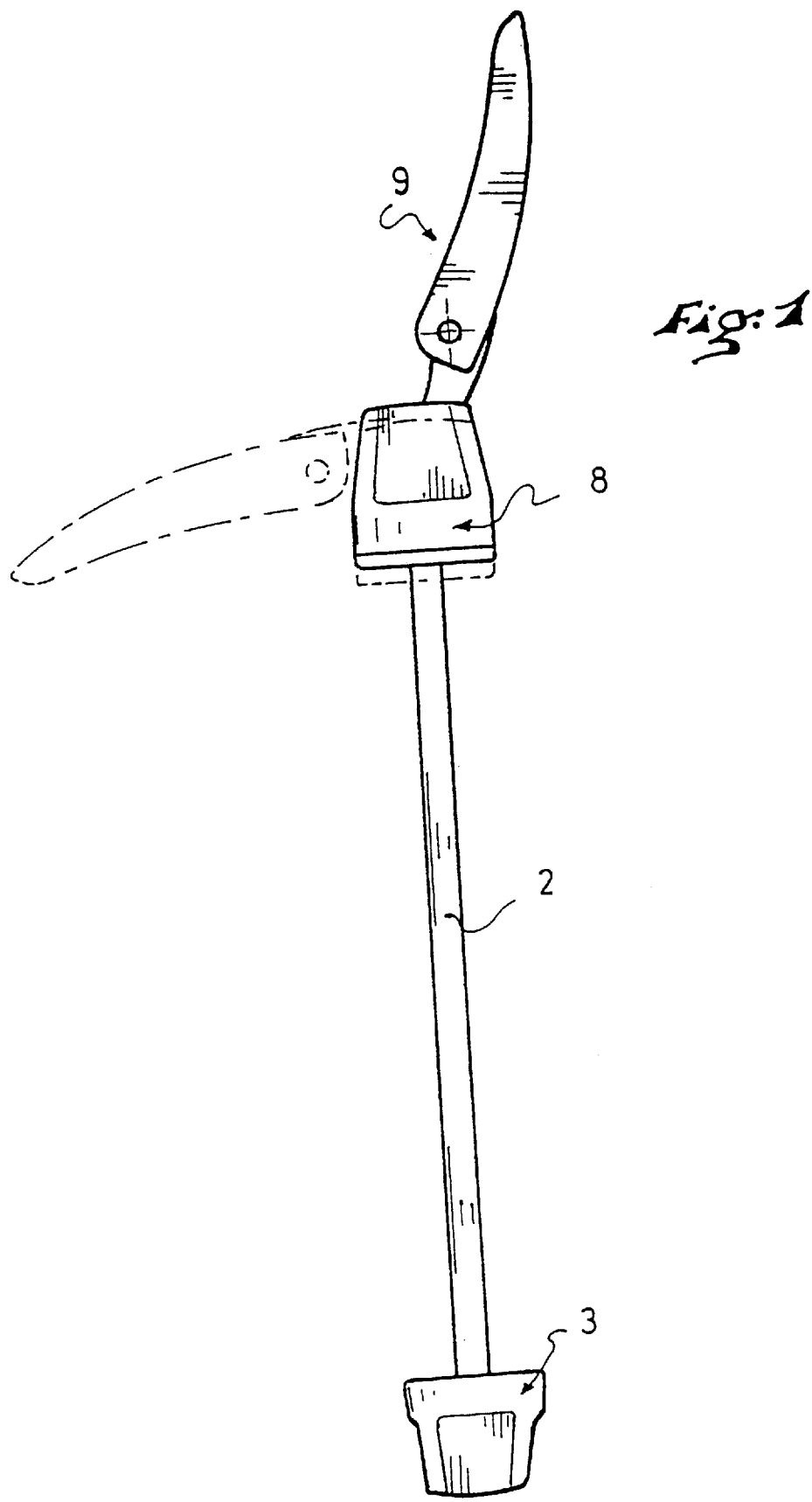

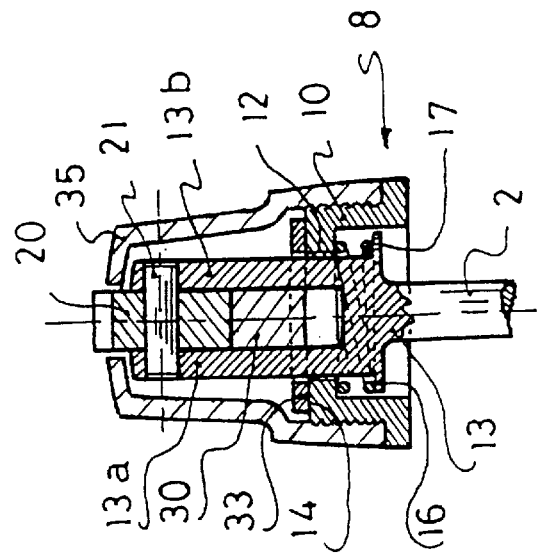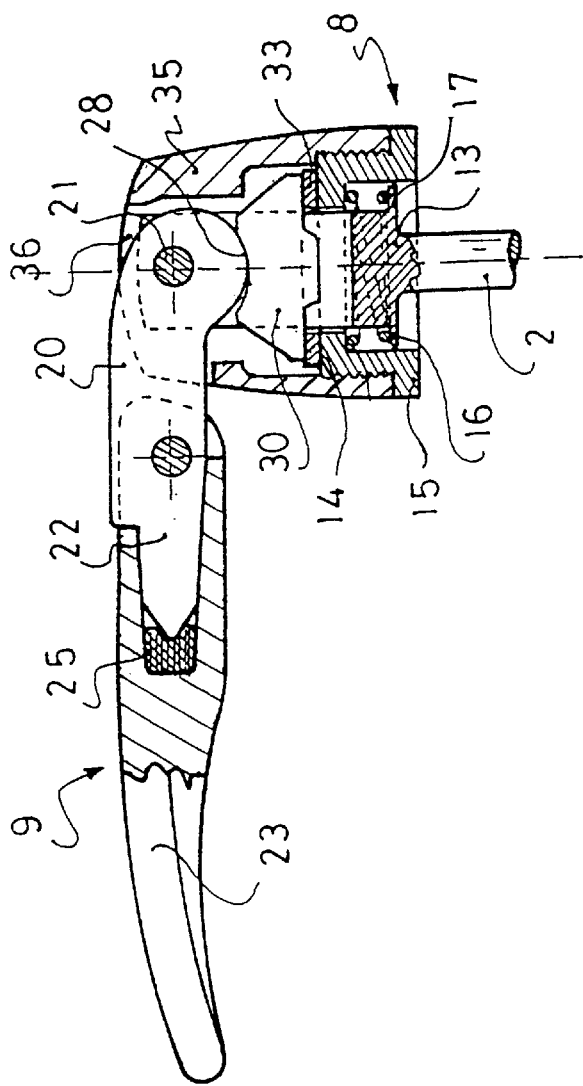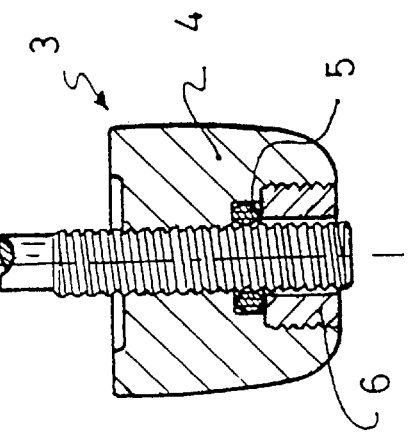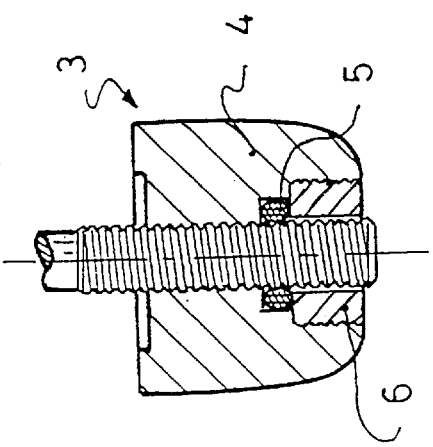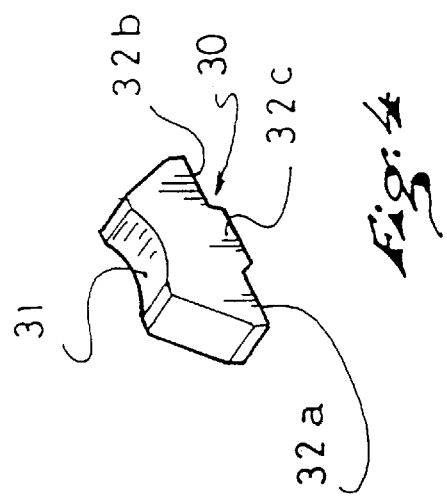

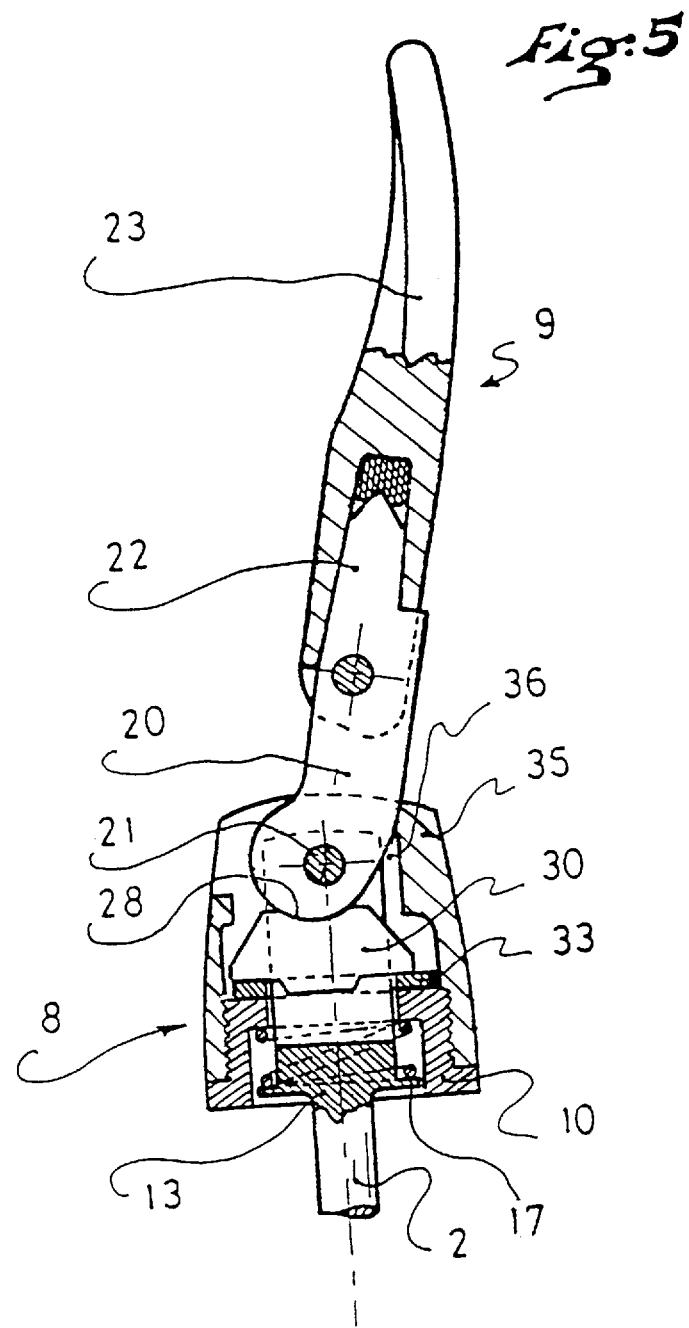

LOCKPIN ADAPTED TO BE USED ON A CYCLE

BACKGROUND OF THE INVENTION

1. Field of the Invention

The invention relates to a pin for quickly locking one element on another, and especially a wheel on a cycle frame or other machine.

2. Description of Background of Relevant Information

Locking pins of the aforementioned type are widely used, especially to very quickly mount and dismount a wheel on a frame. They are also used in the cycle industry, for example to immobilize the saddle bar in the saddle pillar.

The known wheel locking pins include a lengthy rod that extends through the wheel hub, with one rod end projecting on each side of the hub. One of the ends of the rod has a first tightening stop that is generally adjustable along the rod. This is usually a threaded end piece or a nut that is screwed at the threaded end of the rod.

The other end of the rod has a second movable tightening stop, whose movement along the rod is controlled by a lever journaled at the end of the axle and carrying an eccentric cam. The lever and its cam vary the distance separating the two stops. In particular, they make it possible to tighten at one time the two fixing lugs of the fork between the ends of the hub and the tightening stops.

The lever and its eccentric cam exert, at the level of the second stop, a movement with an axial component directed along the general direction of the rod, and a transverse component directed perpendicular to the axis of rotation of the lever.

Certain locking pins have a lever whose control lug is radially offset with respect to the axis of the rod. These pins have the disadvantage that the closing force of the lever is applied in a plane that passes next to the axis of the rod. In addition, the axle of the lever is subjected to torsional stress. Therefore it is necessary to provide it with ample dimensions. Overall, such a lever is not efficient.

For other locking pins, the axle of the lever has the shape of an eccentric cam that circulates in an oblong hole. There is a very high contact pressure between the cam and the wall of the oblong hole. It is therefore necessary to select highly resistant materials.

For yet other locking pins, the transverse component of the tightening movement radially offset the second stop with respect to the axis of the rod. Upon tightening, this movement causes either an offset of the rod, or a radial movement of the second stop with respect to the fixing lug of the fork against which it is pressed. At any event, in both cases, the position of the various elements is not perfectly controlled during tightening.

In addition, for most locking pins, tightening is carried out by rotating the lug of the lever over an angular amplitude of about 180 degrees. The 180 degree rotation is advantageous because it makes it possible to use low slope cams to perform the axial movement. This has the disadvantage that the lug of the lever has, with respect to the rod, a similar angular position in the closed position and in the open position. The specific shape of the lever is not always sufficient to differentiate these two positions, whereby running a possible risk of riding with a lever in the open position, when it is believed to be in the closed position.

The limiting position of the lever during opening is most often defined by an abutting of the eccentric in its housing. As a result, this position is not accurate, and in view of the different lever arm between the lever and the eccentric, premature wear and tear of the eccentric may occur if one has a tendency to strain at the lever during opening.

SUMMARY OF THE INVENTION

An object of the invention is to improve upon the operating mode of the existing locking pins, with a better transfer of the forces, a better distribution of the various movement components between the various elements.

Another object of the invention is to propose a lever whose position clearly shows the locking position of the rod.

Other objects and advantages of the invention will become apparent along the description that follows, such description being however provided by way of a non limiting example.

The locking pin according to the invention has a longitudinal rod, a first tightening stop at one end of the rod, a second tightening stop at the other end of the rod, with a tightening ring that has an internal tightening surface oriented toward the first stop, and an external support surface oriented toward the other side, a lever mounted and journaled at the end of the rod, the lever having a tightening cam off-centered with respect to the axis of rotation of the lever. The axle of the lever is borne by a cap located at the end of the rod, and a movable beam located within lateral arms of the cap is inserted between the periphery of the cam and the external support surface of the second stop.

BRIEF DESCRIPTION OF THE DRAWINGS

The invention will be better understood along the following description, with reference to the annexed drawings that are an integral part thereof, and in which:

FIG. 1 shows a front view of a locking pin according to a non-limiting embodiment of the invention;

FIG. 2 shows the locking pin of FIG. 1 in cross section through a transverse plane;

FIG. 3 shows the pin of FIG. 1 in a side and cross sectional view through a transverse plane;.

FIG. 4 is a perspective view of the beam;

FIG. 5 is a view similar to FIG. 2, with the lever in the open position;

DETAILED DESCRIPTION OF THE INVENTION

Figure 6:
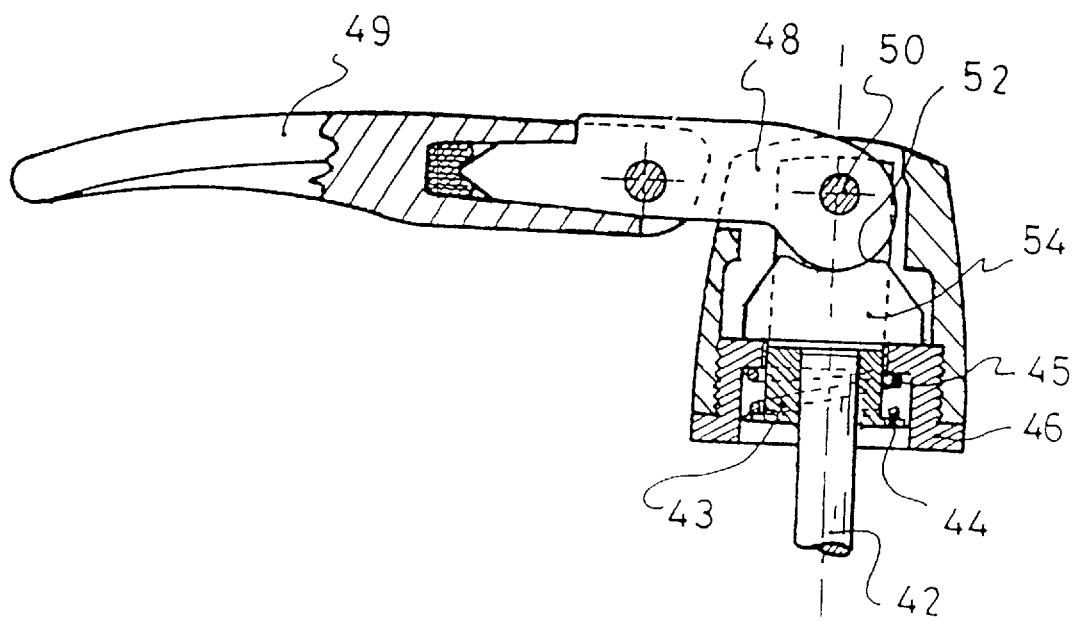
FIG. 6 illustrates an alternative embodiment.

The figures show a locking pin provided for mounting a wheel on the frame of a cycle. However, it is understood that the invention can lend itself to applications other than a locking element on a cycle.

The locking pin shown in FIG. 1 comprises an elongated rod 2 that defines a longitudinal direction. In a known manner, this rod is provided to be engaged into a through opening of the central shaft of the hub.

The rod 2 has a first tightening stop 3 at one of its ends. The position of this stop along the rod is preferably adjustable. As is illustrated, for example, the rod 2 has a threaded zone at its ends, and the stop is a threaded end piece 4 that is screwed on such threaded portion. Preferably, in this case, an O-ring seal 5 serves as a brake between the thread of the rod and the end piece. The seal is located in a shouldered housing of the end piece, and it is retained by a ring 6 that is assembled to the end piece by any appropriate means, such as screwing and adhesion, for example. Of course, any other appropriate means is suitable.

A second tightening stop 8 is located at the other end of the rod 2. In a known manner, this second tightening stop is movable along the rod, and its displacement is controlled by a tightening lever 9. The second stop can be displaced between a loosening position, shown in FIG. 1 in solid line, and a tightening position, shown in FIG. 1 in dotted line. Passage from one position to the other occurs by rotating the tightening lever 9.

The lever activates the displacement of the second stop 8 along the second end of the rod by means that will now be described.

At its second end, the rod has a cap 13 which, in a transverse cross-sectional side view, is U-shaped, and the external surface of which fits into a rotating cylinder centered on the axis of the rod. In the embodiment illustrated, the cap 13 is integral with the rod. This is not limiting, and the cap could be an element machined independently of the rod and attached to its end.

The second stop 8 has a cylindrical tightening ring 10 bored with a central opening 12. The tightening ring 10 is slidably mounted along the arms 13a and 13b of the cap. On the outside of the cap, it has an annular support surface 14 which forms an external support surface.

Preferably, the ring 10 has the shape of a dish whose opening is oriented toward the first end piece, and whose edge 15 forms a tightening surface. The ring 10 is preferably retained by a circular shoulder 16 that is located at the base of the cap, and a spring 17 located between the shoulder 16 and the bottom of the dish.

The profile of the shoulder 16 is adjusted to the internal diameter of the dish. In addition, the central opening 12 of the ring is adjusted to the external diameter of the cap 13. The ring 10 is then guided along a longitudinal direction.

The arms 13a and 13b of the cap define therebetween a housing that is demarcated by two substantially parallel surfaces.

A rocker 20 of the lever 9 is engaged into this housing. The rocker 20 is rotatable about a transverse axle 21 borne by the two arms 13a and 13b of the rocker. As can be seen in the figures, there is no clearance between the rocker 20 of the lever 9 and the axle 21, so that the rocker 20 can rotate about the axis of the axle 21, without additional movement therebetween. The rocker has a uniform thickness, at least in its zone comprised between the two arms of the cap 13. This thickness is substantially equal to the distance between the two arms of the cap. This distance is close to the diameter of the rod.

The rocker 20 outwardly has an arm 22 that is extended by a control lug 23. In the embodiment shown, the lug is an element distinct from the rocker that is fitted on the arm of the rocker and assembled by a pin, a screw, or any other appropriate means, such as clipping, for example. Moreover, a block 25 of deformable material is provided between the rocker and the lug to elastically eliminate the backlash between these two elements.

This mode of construction advantageously makes it possible to select different materials for the rocker and the lug, and in particular, it is possible to make the rocker out of a material provided to withstand high compression stresses, and according to a very simple manufacturing method. For example, the rocker, which has a constant thickness, is made of stainless steel, by simply cutting out a possibly treated metal sheet. The lug can be made of light alloy or plastic material, for example.

In an equally advantageous manner, the axis of rotation 21 of the rocker is provided be biased in shearing by the rocker, and by reaction, by the arms of the cap. Because these elements are juxtaposed, the axle 21 works under proper mechanical conditions, and it is possible for this reason to provide it with a relatively small diameter. As a result, friction is reduced at this level.

Opposite the arm 22, i.e., in the zone of the cap 13, the rocker 20 has a peripheral, eccentric zone 28 that is provided to act like a cam. The distance between the periphery of the cam and the axle 21 increases correspondingly from a first sector located in the extension of the arm to another sector located approximately at the perpendicular. Any appropriate means is suitable to obtain the cam 28, for example, one variable curvature, or a plurality of constant successive curvatures, or a single off-centered curvature. Good results have been obtained with such a distance varying between about 4 and 5 millimeters, i.e., a travel of 1 millimeter at an approximately 120 degree angle of the cam. However, these numbers are not limiting.

A beam 30 is located between the arms of the cap 13, between the cam 28 of the rocker and the ring 10. This beam, which is shown in a perspective front view in FIG. 4, has a generally trapezoidal shape, and a substantially uniform thickness that is equal to the thickness of the rocker. Its upper portion 31 is curved. It is provided to serve as a counter-support to the cam 28. The radius of curvature of this portion is substantially constant and close to the largest radius of curvature of the cam 28, or slightly greater to enable a slight bending of the beam and to maintain a support surface almost per unit length. The fact of having nearly similar radii advantageously makes it possible to reduce the contact pressure between the rocker and the beam. In a known manner, this pressure is indeed dependent upon the difference in the curvature of the elements in contact.

The lower portion of the beam 31 is provided to exert a support against the end piece 10 along the longitudinal direction of the rod. In the embodiment shown, this support occurs by means of a washer 33 whose inner diameter is substantially equal to the outer diameter of the cap 13, and whose outer diameter is close to the outer diameter of the ring 10. The washer is a pressure element, made of any appropriate material, such as stainless steel, for example. Due to the washer 33, the ring 15 can be made of light alloy, such as aluminum alloy, for example.

The lower portion of the beam has three successive portions, two end portions 32a and 32b provided to press on the washer 33 along a diameter thereof, and a central portion 32c projecting with respect to the other two portions engaged within the washer. This central portion has a height close to the thickness of the washer. It ensures the correct positioning and maintenance of the beam above the washer. In a general manner, the length of the beam is less than the outer diameter of the washer. In addition, its central portion has a length that is markedly less than the inner diameter of the washer, such that the beam has a freedom of transverse movement with a limited amplitude along a diameter of the washer.

The diametral movement of the beam is controlled by the cam 28, during the rotation of the rocker 20 about the axle 21. In other words, by pivoting about the axle 21 at an angle of about 90 degrees, the rocker causes both the axial displacement of the beam along the cap 13 over a distance of about 1 millimeter, and its transverse displacement on the washer 33. The freedom of transverse movement of the beam makes it possible to have a curved upper portion 31 having a curvature close to the curvature of the cam.

The trapezoidal shape of the beam takes into account the distribution of the bending moment to which the beam is subjected. This moment is zero at the ends and maximum in the middle of the beam. The projecting central portion 32c increases the section of the beam in this zone in which the bending moment is maximum.

Advantageously, the beam can be made by cutting out a stainless steel metal sheet, or any other material that is resistant to caulking and bending.

FIG. 2 shows the second stop in the tightening position, i.e., the control lug is approximately oriented perpendicular to the rod, and it is the sector of the cam 28 having the longest distance from the axis 31 that exerts a pressure on the beam 30. The beam forces the ring 10 to come closer to the first end piece 4 by taking support on the second end of the rod via the rocker 20 and the axle 21. Advantageously, in this position, the contact zone between the cam 28 and the beam 30 is centered with respect to the axis of the rod. In addition, the radius of curvature of the upper portion 31 of the beam 30 is close to the radius of the active sector of the cam. Thus, the tightening forces are distributed in a substantially symmetrical manner with respect to the longitudinal axis of the rod 2. It must also be noted that the rocker 20 is movable in a plane passing through the axis. The necessary force for bringing the rocker into the tightening position is therefore located entirely in this plane.

FIG. 5 shows the second stop in the loosening position. In this position, the lug 23 and the arm 22 of the rocker 20 are located approximately in the extension of the rod 2, thus placing the beam 30 into contact with the sector having the shortest distance with respect to the axle 21. Under the returning effect of the spring 17, the ring 10 is spaced from the first tightening stop 3, such that the beam 30 can come closer to the axle 21. The spring 17 also exerts on the rocker 48 a moment of elastic return to its loosening position.

To compensate for the eccentricity of the cam 28, the beam 30 is displaced along a diameter of the washer 33. As a guidance, in the embodiment shown, this displacement is on the order of 1 millimeter. Thus, advantageously, the longitudinal component of movement, which is necessary for the tightening of the rod by the eccentric, is here ensured within the stop. This component affects neither the second tightening ring, nor the lever.

Between the two positions of FIG. 2 and FIG. 5, the lever is tilted over an angular amplitude on the order of about 90 degrees, such that in the loosening position, the lever 9 is located approximately in the extension of the rod 2. Such an angular movement of 90 degrees, or slightly greater, that is allowed in view of the large diameter of the cam is advantageous because it makes it possible to clearly differentiate the loosening position with respect to the tightening position.

In the embodiment illustrated in the figures, the tightening stop 8 further includes a cover 35 that is screwed onto the outer wall of the ring 10. The cover has an opening 36 through which the rocker 20 extends. The opening is provided to allow the angular movement of the lever 20, and preferably to accurately define its two end positions, in particular the loosening position to which the lever 9 is returned by the spring 17.

According to a particular embodiment, the cover 35 has, along its inner wall, two grooves in which the ends of the beam are guided. The beam and the cap are thus affixed to the cover in rotation about the axis of the rod, and only the rings 10 and the washer can rotate. Other means having the same effect can also be suited.

The assembly of the various elements of the stop 8 is carried out in the following manner: the spring 17 and the ring 10 are fitted on the cap 13. The beam 30, the rocker 20 and the axle 21 are then positioned between the arms of the cap. The cover is here shown onto the rocker, and it is screwed on the ring 10 by rotation thereof. Indeed, the beam and the rod do not rotate with respect to the cover during screwing. Finally, the control lug 23 is assembled to the end of the rocker 20.

FIG. 6 shows an alternative embodiment of the second tightening stop.

According to this alternative embodiment, the cap 43 is an independent element assembled to the end of the rod 42. As in the preceding case, the base of the cap has a shoulder 44. A ring 46 is engaged on the cap 43, and it is returned elastically toward the end of the rod by a spring 45.

A rocker 48 extended by a control lug 49 is journalled between the arms of the cap about an axle 50. The rocker further has a cam 52 that is in support against a beam 54. The beam 54 here has a rectilinear base, in which the two end portions are in support directly on the ring 46.

The functioning of the this stop is similar to that of the preceding stop, and its assembly easily follows what has been described previously.

Of course, the invention is not limited to the various embodiments that have been described, and alternative embodiments are possible.

In particular, the lever could be constructed differently, for example, in one piece, with an opening provided in the cover for passage of such a lever.

Instead of being assembled to the ring, the cover could be assembled to the end of the rod, via the axis, for example, and could slide along the ring at the same time as the ring slides along the cap.

The internal surfaces of the tightening rings can be provided with any appropriate means, for example raised serrations, in order to improve the adherence of these rings against the surfaces to be tightened.

In the case of a quick locking pin for a wheel, one can also add, on each side of the hub, a small spring that ensures the centered position of the rod with respect to the hub, in particular in the loosened position of the rod. These springs facilitate the positioning of the hub and of the rod in the fixing lugs of the frame, as well as their release.

The angular movement of the lever is not limiting either. According to the invention, a movement on the order of 90–120 degrees is preferred to properly differentiate the pin locking positions. Of course, movements greater than 120 degrees, or less than 90 degrees if necessary, can be suited.

Other alternative constructions are possible without leaving the scope of the invention.

Finally, as has been indicated in the beginning of the description, the invention can lend itself to other applications than wheel quick locking pins, and especially the pins for locking the saddle bar in the saddle pillar, or in a general manner, the pins for quick tightening a collar.

We claim:

1. A quick-locking pin comprising:
    a longitudinally extending rod;
    a first tightening stop at a first end of said rod;
    a second tightening stop at a second end of said rod, said second tightening stop having a tightening ring engaged on said second end of said rod, an internal tightening surface facing said first tightening stop, and an external support surface facing in a direction opposite to that of said first stop, said second end of said rod terminating in a cap having a pair of laterally spaced arms;

a lever positioned between said laterally spaced; arms of said cap, a journal connection between said lever and said laterally spaced arms of said cap to define an axis of rotation of said lever, said lever having a tightening cam off-centered with respect to said axis of rotation; and a beam positioned between said laterally spaced arms and between said cam and said external support surface of said tightening ring of said second tightening stop, said beam being positioned for movement in a direction along said longitudinally extending rod and in a direction perpendicular to said longitudinally extending rod upon rotation of said lever about said axis of rotation.

2. A quick-locking pin according to claim 1, wherein:

said journal connection between said lever includes an axle carried by said laterally spaced arms of said cap; and no clearance is provided between said lever and around said axle.

3. A quick-locking pin according to claim 1, wherein:

said journal connection between said lever includes an axle extending through an opening in said lever, said axle and said opening in said lever having a common diameter for facilitating rotation of said lever about said axis of rotation.

4. A quick-locking pin according to claim 1, wherein:

said beam has a curved portion facing said cam of said lever; and said cam of said lever has a curvature close to a curvature of said curved portion of said beam.

5. A quick-locking pin according to claim 4 wherein:

said curved portion of said beam comprises an inwardly curved surface, said cam of said lever being seated in said inwardly curved surface.

6. A quick-locking pin according to claim 1, wherein:

said beam has opposite sides facing respective ones of said laterally spaced arms, said sides having a generally trapezoidal shape, a top of said trapezoidal shape facing said cam.

7. A quick-locking pin according to claim 6, wherein:

said beam further has a base having three portions, including a pair of support portions and a central portion between said support portions, said central portion projecting from said support portions in a direction toward said first tightening stop.

8. A quick-locking pin according to claim 7, wherein:

said central projecting portion of said beam has a length less than a diameter of an opening of said tightening ring, whereby said beam is guided for said perpendicular movement.

9. A quick-locking pin according to claim 8, wherein:

a washer is positioned between said tightening ring and said support portions of said beam and said central projecting portion of said beam projects into an opening of said washer.

10. A quick-locking pin according to claim 1, wherein:

between said laterally spaced arms of said cap, said lever includes a thin rocker.

11. A quick-locking pin according to claim 10, wherein:

said cam extends on said rocker between two sectors located approximately at a right angle with respect to each other, so as to define a tightening position and a loosening position of said lever, angularly spaced apart by approximately 90 degrees.

12. A quick-locking pin according to claim 1, wherein:

said tightening ring is engaged with and guided along said laterally spaced arms of said cap.

13. A quick-locking pin according to claim 12, wherein:

said cap has a base having a shoulder; and a return spring is located between said shoulder and said tightening ring.

14. A quick-locking pin comprising:

a longitudinally extending rod;

a first tightening stop at a first end of said rod;

a second tightening stop at a second end of said rod, said second tightening stop having a tightening ring engaged on said second end of said rod, an internal tightening surface facing said first tightening stop, and an external support surface facing in a direction opposite to that of said first stop, said second end of said rod terminating in a cap having a pair of laterally spaced arms;

a lever positioned between said laterally spaced arms of said cap, a journal connection between said lever and said laterally spaced arms of said cap to define an axis of rotation of said lever, said lever having a tightening cam off-centered with respect to said axis of rotation;

a beam positioned between said laterally spaced arms and between said cam and said external support surface of said tightening ring of said second tightening stop; and means for enabling movement of said beam transverse of said longitudinally extending rod upon rotation of said lever about said axis of rotation.

15. A quick-locking pin according to claim 14, wherein:

said movement of said beam transverse of said longitudinally extending rod comprises movement of said beam perpendicular to said longitudinally extending rod.

16. A quick-locking pin according to claim 14, wherein:

said means for enabling transverse movement of said beam comprises means for causing a combination of transverse movement and longitudinal movement of said beam with respect to said rod.

17. A quick-locking pin according to claim 16, wherein:

said second end of said rod includes a shoulder; and a return spring is located between said shoulder and said tightening ring for opposing said longitudinal movement of said beam caused by said cam.

18. A quick-locking pin according to claim 14, wherein:

said journal connection between said lever includes an axle carried by said laterally spaced arms of said cap; and no clearance is provided between said lever and around said axle.

19. A quick-locking pin according to claim 14, wherein:

said journal connection between said lever includes an axle extending through an opening in said lever, said axle and said opening in said lever having a common diameter for facilitating rotation of said lever about said axis of rotation.

20. A quick-locking pin according to claim 14, wherein:

said tightening ring is engaged with and guided along said laterally spaced arms of said cap.

* * * * *